Patented Aug. 25, 1931

1,820,607

UNITED STATES PATENT OFFICE

RUDOLF ENGELHARDT, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY

NONIRRITATING COMPOSITIONS CONTAINING ORGANIC COMPOUNDS WHICH IRRITATE THE SKIN

No Drawing. Application filed March 30, 1927, Serial No. 179,723, and in Germany April 12, 1926.

It is known that certain organic compounds which are used for moulding, insulating, impregnating and analogous purposes and in moulding, insulating, impregnating and other compositions which are manipulated by hand or under such conditions that workmen are subjected to contact therewith or the fumes thereof, exert an irritating action upon the skin and mucous membrane of the workmen. The most commonly encountered of these irritating organic compounds are the halogenated or halogen containing bodies such as the halogenated and more particularly the chlorinated naphthalenes.

In working with such compounds and compositions containing them the workmen must be protected by suitable means such as hoods, gas masks, especially designed clothing and the like which are expensive and inconvenient.

An object of the present invention is to render the irritating organic compounds non-irritating without destroying the properties upon which their usefulness depends. This may be accomplished, as I have found, by mixing the irritating compounds with non-irritating materials having similar physical properties. Among the non-irritating materials suitable for use generally may be mentioned paraffin wax, ceresine wax, pitch, rubber and the like. Only a relatively small quantity of the non-irritating material is required, i. e., the irritating action of the organic compounds may be substantially reduced or entirely prevented by the addition of a quantity of a non-irritating adulterant having similar physical properties which is insufficient to materially alter the properties of the irritating compound.

I have also found that the irritating action of organic compounds generally may be materially reduced or substantially destroyed by means of agents having an alkaline action, such as sodium phosphate, calcium oxide, magnesium oxide, pyridine, tetrahydroquinaldine, urea and the like, which alkaline materials are effective when used in quantities insufficient to materially affect the physical properties of the irritating organic compounds. The combined effects of additions of non-irritating diluents, such as paraffin wax and substances having an alkaline action, such as sodium phosphate, may be obtained by the use of substances of both types.

The following examples are illustrative:

*Example 1.* 100 parts by weight of tetrachlornaphthalene, an irritating organic compound, are mixed by stirring for several hours with about 7 parts by weight of pitch. The physical properties of the product are substantially the same as those of tetrachlornaphthalene but the product is not irritating to the skin.

*Example 2.* 100 parts by weight of tetrachlornaphthalene are mixed by stirring for several hours with 10 parts by weight of magnesium oxide. The product is non-irritating and has the desired physical properties.

*Example 3.* 100 parts by weight of tetrachlornaphthalene are mixed by stirring for several hours with 10 parts by weight of paraffin wax and 5 parts by weight of magnesium oxide. The product is non-irritating and has the desired physical properties.

*Example 4.* 100 parts by weight of tetrachlorotoluol are fused whilst stirring together with 9 parts by weight of pitch and 2 parts by weight of urea.

It will be understood that the foregoing examples are merely illustrative. What may be done with tetrachlornaphthalene by the use of pitch, paraffin wax and magnesium oxide may also be done with other irritating organic compounds by the use of other non-irritating plastic organic material such as ceresine wax, rubber, etc. and other compounds having an alkaline action such as sodium phosphate, urea, etc.

I claim:

1. As a new product a non-irritating composition of matter comprising a halogenated naphthalene which is irritating to the skin and is used for moulding, insulating, impregnating and similar purposes intimately mixed with a relatively small amount of a material of the group consisting of organic bases, alkaline earth metal oxides and basic reacting salts.

2. As a new product a non-irritating composition of matter comprising a halogenated naphthalene which is irritating to the skin and is used for moulding, insulating, impregnating and similar purposes intimately mixed with relatively small amounts of a material of the group consisting of organic bases, alkaline earth metal oxides and basic reacting salts and a non-irritating plastic organic material of the group consisting of wax, pitch, rubber and resin.

3. As a new product a non-irritating composition comprising a halogenated naphthalene which is irritating to the skin intimately mixed with a relatively small amount of magnesium oxide.

4. As a new product a non-irritating composition comprising a halogenated naphthalene which is irritating to the skin intimately mixed with relatively small amounts of a magnesium oxide and a non-irritating plastic organic material of the group consisting of wax, pitch, rubber and resin.

5. As a new product a non-irritating composition comprising a tetrachlornaphthalene which is irritating to the skin intimately mixed with a relatively small amount of a material of the group consisting of organic bases, alkaline earth metal oxides and basic reacting salts.

6. As a new product a non-irritating composition comprising a tetrachlornaphthalene which is irritating to the skin intimately mixed with relatively small amounts of a material of the group consisting of organic bases, alkaline earth metal oxides and basic reacting salts and a non-irritating plastic organic material of the group consisting of wax, pitch, rubber and resin.

7. As a new product a non-irritating composition comprising a tetrachlornaphthalene which is irritating to the skin intimately mixed with a relatively small amount of magnesium oxide.

8. As a new product a non-irritating composition comprising a tetrachlornaphthalene which is irritating to the skin intimately mixed with a relatively small amount of magnesium oxide and a relatively small amount of paraffin wax.

In testimony whereof, I affix my signature.

RUDOLF ENGELHARDT.